United States Patent
Langadi et al.

(10) Patent No.: US 9,003,260 B2
(45) Date of Patent: Apr. 7, 2015

(54) PARTIAL-WRITES TO ECC (ERROR CHECK CODE) ENABLED MEMORIES

(75) Inventors: Saya Goud Langadi, Bangalore (IN); Padmini Sampath, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 264 days.

(21) Appl. No.: 13/424,564

(22) Filed: Mar. 20, 2012

(65) Prior Publication Data

US 2013/0007574 A1    Jan. 3, 2013

(30) Foreign Application Priority Data

Jun. 29, 2011  (IN) .......................... 2200/CHE/2011

(51) Int. Cl.
*G06F 11/10* (2006.01)
*G06F 13/16* (2006.01)

(52) U.S. Cl.
CPC ........ *G06F 11/1048* (2013.01); *G06F 13/1673* (2013.01)

(58) Field of Classification Search
CPC ............ G06F 13/1673; G06F 11/1048; G06F 11/1052; G06F 11/1008; G11C 8/06; G11C 8/16; G11C 29/42; G11C 2029/0411; H03M 13/19
USPC ................................... 714/758, 763; 711/155
See application file for complete search history.

(56) References Cited

U.S. PATENT DOCUMENTS

| | | | | |
|---|---|---|---|---|
| 5,313,475 A * | 5/1994 | Cromer et al. | ............... | 714/758 |
| 5,369,651 A * | 11/1994 | Marisetty | ....................... | 714/767 |
| 5,452,429 A * | 9/1995 | Fuoco et al. | .................... | 714/6.1 |
| 5,864,568 A * | 1/1999 | Nemazie | ....................... | 714/769 |
| 6,101,614 A * | 8/2000 | Gonzales et al. | .............. | 714/6.1 |
| 6,363,502 B1 * | 3/2002 | Jeddeloh | ......................... | 714/52 |
| 6,937,247 B2 * | 8/2005 | Chang et al. | ................... | 345/567 |
| 7,206,891 B2 * | 4/2007 | Emerson et al. | .............. | 711/100 |
| 7,257,762 B2 * | 8/2007 | Holm et al. | .................... | 714/763 |
| 7,275,200 B2 * | 9/2007 | Leung | ............................ | 714/763 |
| 7,814,300 B2 * | 10/2010 | Moyer et al. | ................... | 712/219 |
| 7,930,615 B2 * | 4/2011 | Kohler et al. | .................. | 714/763 |
| 8,438,344 B2 * | 5/2013 | Kumar et al. | .................. | 711/155 |
| 8,468,416 B2 * | 6/2013 | Gara et al. | ...................... | 714/758 |
| 2008/0168331 A1 * | 7/2008 | Vogelsang et al. | ............ | 714/770 |

OTHER PUBLICATIONS

Jin-Fu Li; Yu-Jane Huang, "An error detection and correction scheme for RAMs with partial-write function," Memory Technology, Design, and Testing, 2005. MTDT 2005. 2005 IEEE International Workshop on , vol., No., pp. 115,120, Aug. 5-5, 2005.*

Mounes-Toussi, F.; Lilja, D.J., "Write buffer design for cache-coherent shared-memory multiprocessors," Computer Design: VLSI in Computers and Processors, 1995. ICCD '95. Proceedings., 1995 IEEE International Conference on , vol., No., pp. 506,511, Oct. 2-4, 1995.*

* cited by examiner

*Primary Examiner* — Cynthia Britt
(74) *Attorney, Agent, or Firm* — John R. Pessetto; Frank D. Cimino

(57) ABSTRACT

A memory system includes a memory and a memory controller coupled to the memory. The memory controller includes a data buffer configured to store a full data word as a result of a partial write operation, wherein for a subsequent partial write operation, data is read from the data buffer.

13 Claims, 5 Drawing Sheets

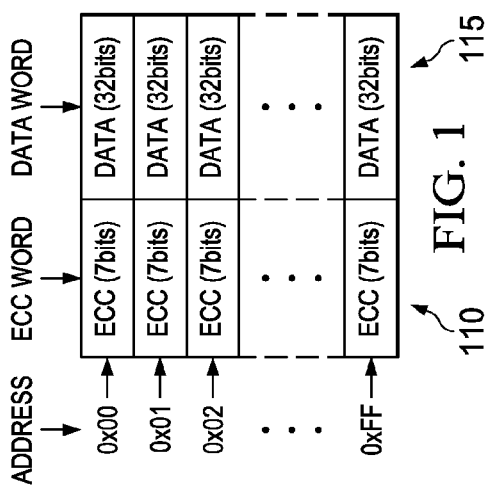
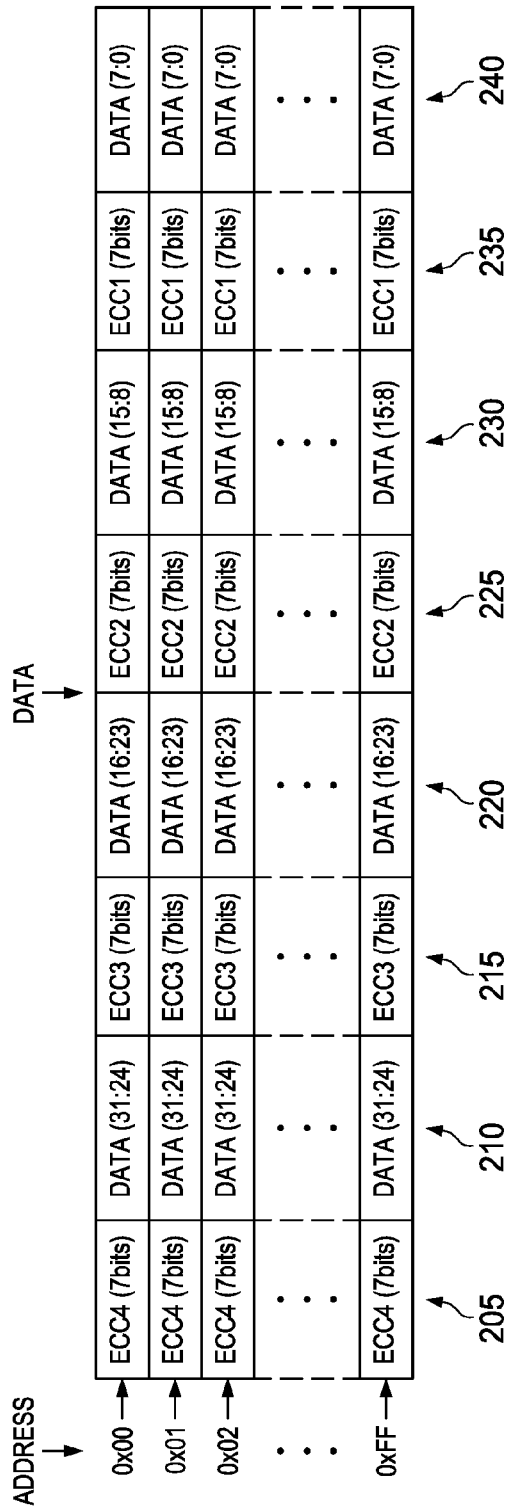

PARTIAL-WRITES TO ECC (ERROR CHECK CODE) ENABLED MEMORIES

This application claims priority from India Provisional Application, application number 2200/CHE/2011 filed Jun. 29, 2011, entitled "A METHOD TO IMPLEMENT PARTIAL-WRITES TO ECC ENABLED MEMORIES TO REDUCE THE AREA OVERHEAD", which is incorporated herein by reference in its entirety.

TECHNICAL FIELD

Embodiments of the disclosure relate partial writes in error check code (ECC) enabled memories.

BACKGROUND

ECC enabled memory means additional information called ECC (Error correction code) is stored in memory in addition to actual data. These ECC bits are used to check consistency of the data when data is read from the memory. Using ECC code any data corruption can be detected and corrupted data can be corrected.

To detect or correct errors on N bit data word requires M bits of ECC code. Number of bits required to store N bit data word is N+M bits. M bits of ECC code for every N bit data word is area overhead to support ECC.

Upon a write access to memory, ECC will be computed and written to memory along with the data. When data is read, consistency of data is checked using ECC bits, data errors may or may not corrected based on the ECC scheme.

Typically in a system, memories are accessed by the CPU or peripheral or both. CPU or peripheral can initiate accesses of different sizes that are byte access (8 bit), half word access (16 bit) and full word accesses (32 bit). If the size of the accesses is less than memory word size N then a read modify write (RMW) needs to be performed to update the data in to the memory, a write access with size smaller than memory word size N is called partial write. For a partial write to memory a RMW operation is required because only part of the data word N is getting updated and ECC is for the whole word, current memory contents are needed to recalculate the ECC word.

A RMW operation is a two cycle operation as ECC word is shared by the whole word. This will impact the overall system throughput as RMW operation takes one extra cycle to complete a partial write.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An example embodiment provides a memory system. The memory system includes a memory and a memory controller coupled to the memory. The memory controller includes a data buffer configured to store a full data word as a result of a partial write operation, wherein for a subsequent partial write operation, data is read from the data buffer.

Another example embodiment provides a method for performing partial write operations in a memory. A full data word is stored as a result of a partial write operation in a data buffer. Then, for a subsequent partial write operation data from the data buffer thereby saving a cycle required for the read operation.

Another example embodiment provides an integrated circuit including one of a central processing unit and a peripheral and a memory system configured to communicate with one of the central processing unit and a peripheral. The memory system includes a memory and a memory controller coupled to the memory. The memory controller includes a data buffer configured to store a full data word as a result of a partial write operation, wherein for a subsequent partial write operation, data is read from the data buffer. The memory controller includes a first multiplexer that selects data from one of the memory and the data buffer; a first ECC check module, coupled to the data buffer, that performs an ECC check during the read operation; a second ECC check module coupled to the first multiplexer that performs an ECC check on an output of the first multiplexer; a modify module coupled to the second ECC check module that performs a modify operation by taking required data from a request for the subsequent partial write operation and data from the full data word; and a second multiplexer that selects data from and output of the modify module.

Other aspects and example embodiments are provided in the Drawings and the Detailed Description that follows.

BRIEF DESCRIPTION OF THE VIEWS OF DRAWINGS

FIG. 1 illustrates the data organization of 32 bit word (N) memory with 7 bit ECC word;

FIG. 2 illustrates the data organization in a memory having a separate ECC word for each byte;

DETAILED DESCRIPTION OF THE EMBODIMENTS

Figure 3:
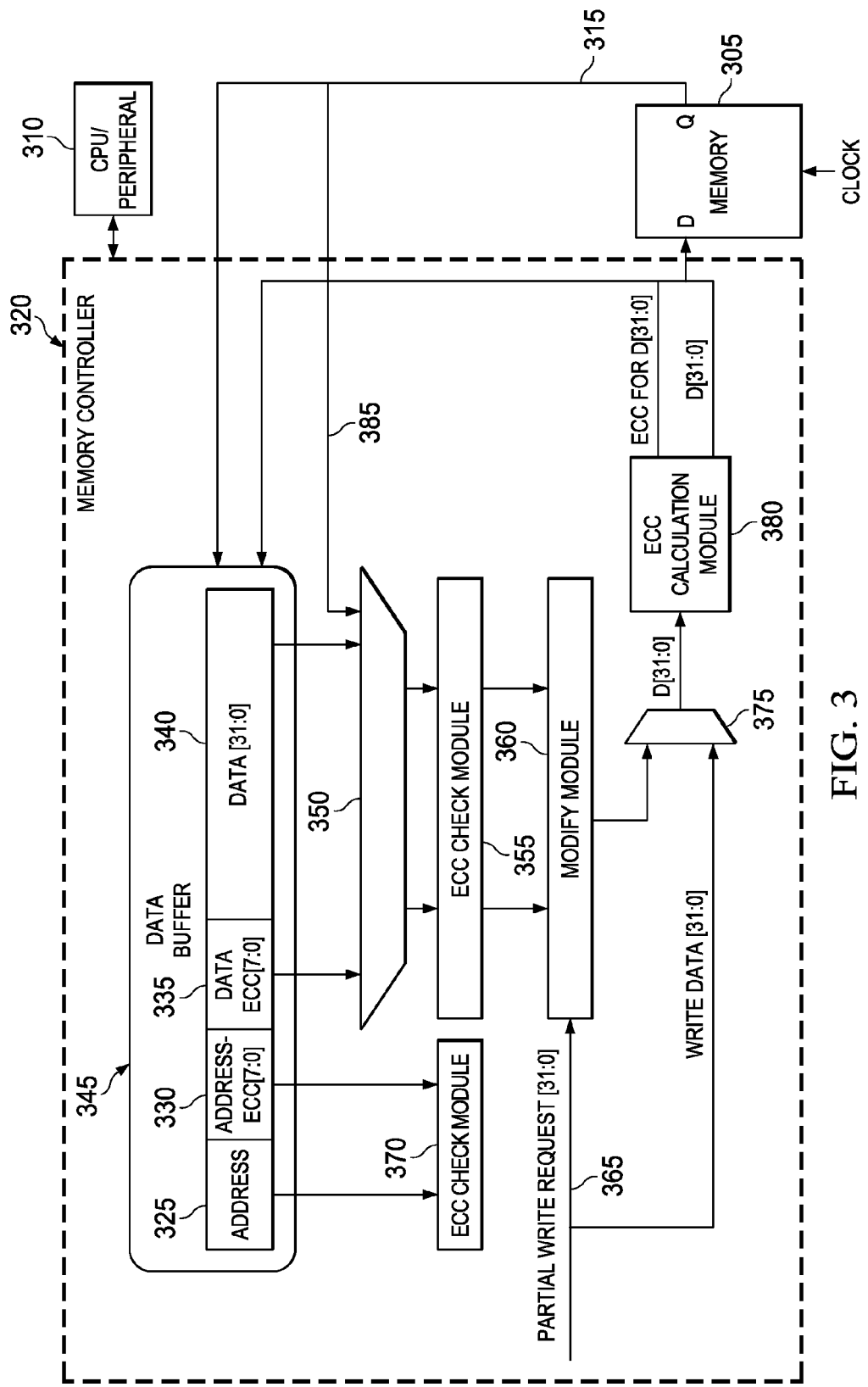
FIG. 3 is a block diagram of a memory system in accordance with an embodiment.

FIG. 1 illustrates the data organization of 32 bit word (N) memory with 7 bit ECC word (M), each 32 bits of data (115) has additional 7 bits of ECC code (110). 256 words (256×32) of memory require 256×7 additional bits to implement ECC. If CPU or peripheral is performing a byte (8 bit) write access then a RMW operation will be performed. Assuming the smallest size of write access is a byte write access then memory can be organized as in FIG. 2 by adding a separate ECC word each byte to improve the throughput of memory. ECC1 (235), ECC2 (225), ECC3 (215) and ECC4 (205) are the ECC words for Data[7:0](240), Data[15:16](230), Data [23:16](220), Data[31:24](210) respectively. The memory scheme illustrated in FIG. 2 eliminates the need for RMW operation and hence improves the throughput of the memory. However, this scheme adds significantly to the area overhead. Approximately 54% of extra number of bits is required as compared to the scheme as illustrated in FIG. 1.

Upon partial write access to memory, N bit data word will be read from memory. When N bit data is available, appropriate portion of read data is modified and new data is inserted to generate write data (output of 360). Then a memory write to full data word (hereinafter data word) is initiated with new data. In addition to initiating data word write to memory, new data word is written to data buffer. Buffer data acts an image of memory location for which partial write was done. As part of the burst accesses a series of partial writes with incrementing address are initiated, first partial write is performed with RMW operation and data-buffer is updated. For subsequent accesses which fall in the same word are completed without RMW operation as data buffer holds the latest data of that memory address.

Referring now to FIG. 3, a memory system according to an embodiment is illustrated. As an example, FIG. 3 illustrates the memory system for N=32 and M=7, however this scheme can be extended to any N and M values. The memory system is implemented in an integrated circuit and includes a memory 305 and a memory controller 320 configured to communicate to each other. Based on instructions from the memory controller 320 data gets written to the memory 305 or data gets read from the memory 305. An input to the memory 305 is 'D' on which write data and its ECC is placed. An output of the memory is 'Q' on which read data is available (on line 315). A CPU or peripheral 310 is coupled to the memory controller 320 through a data bus and is configured to send instructions to the memory controller. In one embodiment, CPU/peripheral 310 sends a request for a partial write operation, hereinafter partial write request, to the memory controller 320. The memory controller includes a data buffer 345.

The data buffer includes four data fields namely address (325), ECC for address (330), ECC for data (335) and data (340) word itself. Address 325 indicates address of the data which is being stored in the buffer. Number address bits are defined by the size of the memory. Address ECC 330 is the ECC for the address. Like memory the flops which store address are also prone to soft error. Storing the ECC detect error in the address 325. Data 340 indicates data word of address specified by the address 325. The ECC check module 370 (first ECC check module) coupled to the data buffer 345 performs an ECC check during a read operation of the read, modify and write (RMW). The ECC check module 370 receives the address 325 and address ECC 330, and then detects if there are any error on the address 325. A multiplexer 350 (first multiplexer) is coupled to the data buffer 345. The multiplexer receives data ECC 335, data 340, and data from the memory (on line 385) and selects either data from the data buffer 345 or from the memory 305. Output of the multiplexer 350 is coupled to another ECC check module 355 (second ECC check module) and is configured to check for any errors in the output of the multiplexer 350. Output of the ECC check module 355 is coupled to a modify module 360. Another multiplexer 375 (second multiplexer) is coupled to the output of the modify module 360 and to the line where partial write request comes from the CPU 310. The multiplexer 375 selects data from the partial write request or subsequent partial write request and output of the modify module. An output of the multiplexer 375 is coupled to an ECC calculation module 380. The ECC calculation module 380 calculates ECC for the modified data word in case of data modification and stores that in the data buffer 345.

When a request for a partial write is issued by the CPU or peripheral 310, certain checks are performed to see if it is a write access or a read access. If it is a write access, another check is performed to see if it is a partial write access. If the request is for a partial write access, it requires a read modify write (RMW) operation. When the modify operation is performed, in one embodiment, data is stored in the data buffer 345 along with address (325), ECC for address (330), ECC for data (335) and data (340) word itself. In other words as a result of the partial write operation a full data word is stored in the data buffer 345. When the memory controller 320 receives a subsequent partial write request to the same data word, data is read from the data buffer 345 in one embodiment since it is already stored and available instead of reading data from the memory 305. This saves cycle time for the redundant read operation if the read operation was to be performed from the memory. Operation of the memory system of FIG. 3 is explained in detail with the help of the flow chart as illustrated in FIG. 4.

Figure 4:
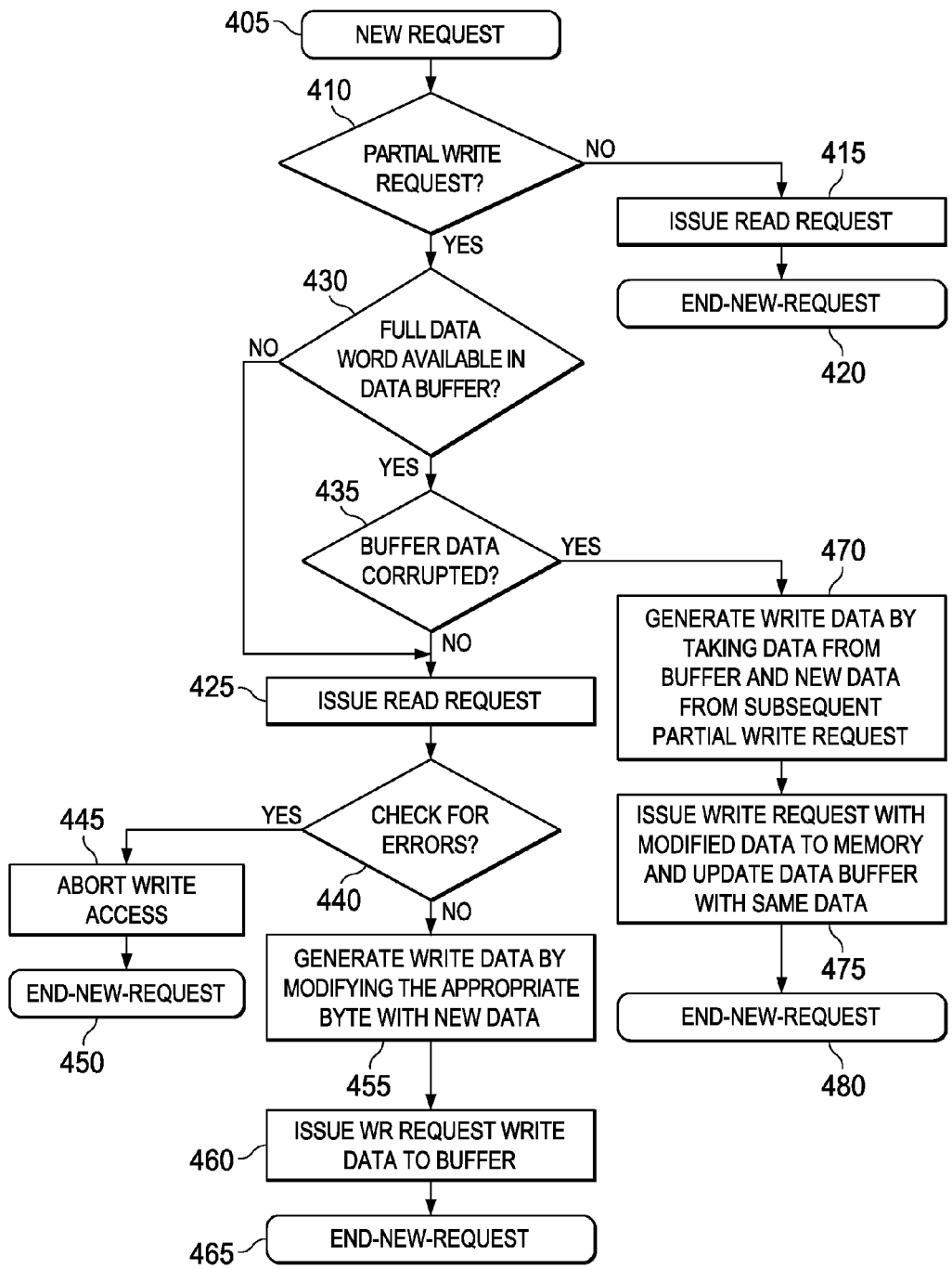
FIG. 4 is a flowchart illustrating a method for performing partial write operations in a memory, in accordance with an embodiment.

Referring now to FIG. 4, various steps involved in performing the partial write operation according to an embodiment is illustrated. A new request is received at step 405. A new memory access request can be initiated by either a CPU or a peripheral (310). The new request can be a read or write operation to the memory (305). At step 410, a check is performed to determine if the request is a partial write request. If it is a read access and not a partial write access, then a read request is issued to the memory at step 415. This ends the new request at step 420. If the new request is a partial write request which requires a RMW operation, a check is performed at step 430 to determine if full data word is available in the data buffer (345) which is stored as a result of a previous partial write operation. If the data is not available in the data buffer then a read request is initiated to memory as part of RMW operation at step 425. A check is performed, at step 440 for the errors in data read from the memory as result of step 425. Due to the soft errors there is a possibility that data in the memory may have been corrupted. Error check is done on read operation from the memory, data from the memory appears on line 385 to the multiplexer 350. On read operation multiplexer 350 selects the data from the memory during the step 440. If there are errors in the data read from the memory then the partial write access is aborted at step 445 and the new request is ended at step 450. In such cases it is optional to indicate it back to the CPU/peripheral that partial write was not successful.

If the data read from memory is free from errors then a modify operation is performed (by the modify module 360). If the data is having correctable error then modify operation is performed on corrected data (output of the. ECC check module 355). Modify operation (306) take the data from ECC check module 355 and then replaces appropriate data bits with new data from the partial write request 365 at step 455. A write request is initiated with modified data to memory and at the same time the data buffer (345) is updated with same data at step 460. When a write request is placed, ECC for new word is computed (by the ECC calculation module 380) and is written to memory. Further the new request is ended at step 465. Data buffers also stores the ECC for data word and address of the data. ECC word is stored to enable the data integrity check when data used from the buffer to perform partial write. The data integrity check includes, detecting errors on buffer address and buffer data. This way the data in buffer is protected from errors. Address is also protected to ensure that if there soft-error on address which can cause false address compares is detected. Address is compared during the step 430.

If data word which is in the data buffer is free from errors, to complete the partial write there is no need to read the data from the memory as this data already available in the data buffer. So modify operation (by modify module 360) can be performed using the buffer data (345). In this case of partial write there is no need for RMW operation since data is available in the buffer and access is completed in one cycle. Using the data buffer eliminates the need for reading the same word from the memory. Assuming a case where N=32 and M=7 and that there is burst of byte write accesses with burst of size 4 i.e. 4 partial write falling in the same data word. This burst takes 8 cycles with the schemes illustrated in FIGS. 1 and 2 but with proposed implementation it takes only 5 cycles. Only first byte access takes 2 cycles as it required RMW operation, subsequent accesses are completed in 1 cycle as those does not required RMW operation as data to perform partial write is already available in the buffer.

At step 470, a write data is generated by taking data word from the data buffer and new data from the subsequent partial write request. At step 475, a write request with modified data is issued to memory and at the same time the data buffer (345) is updated with same data. The new request is ended at step 480.

Figure 5:
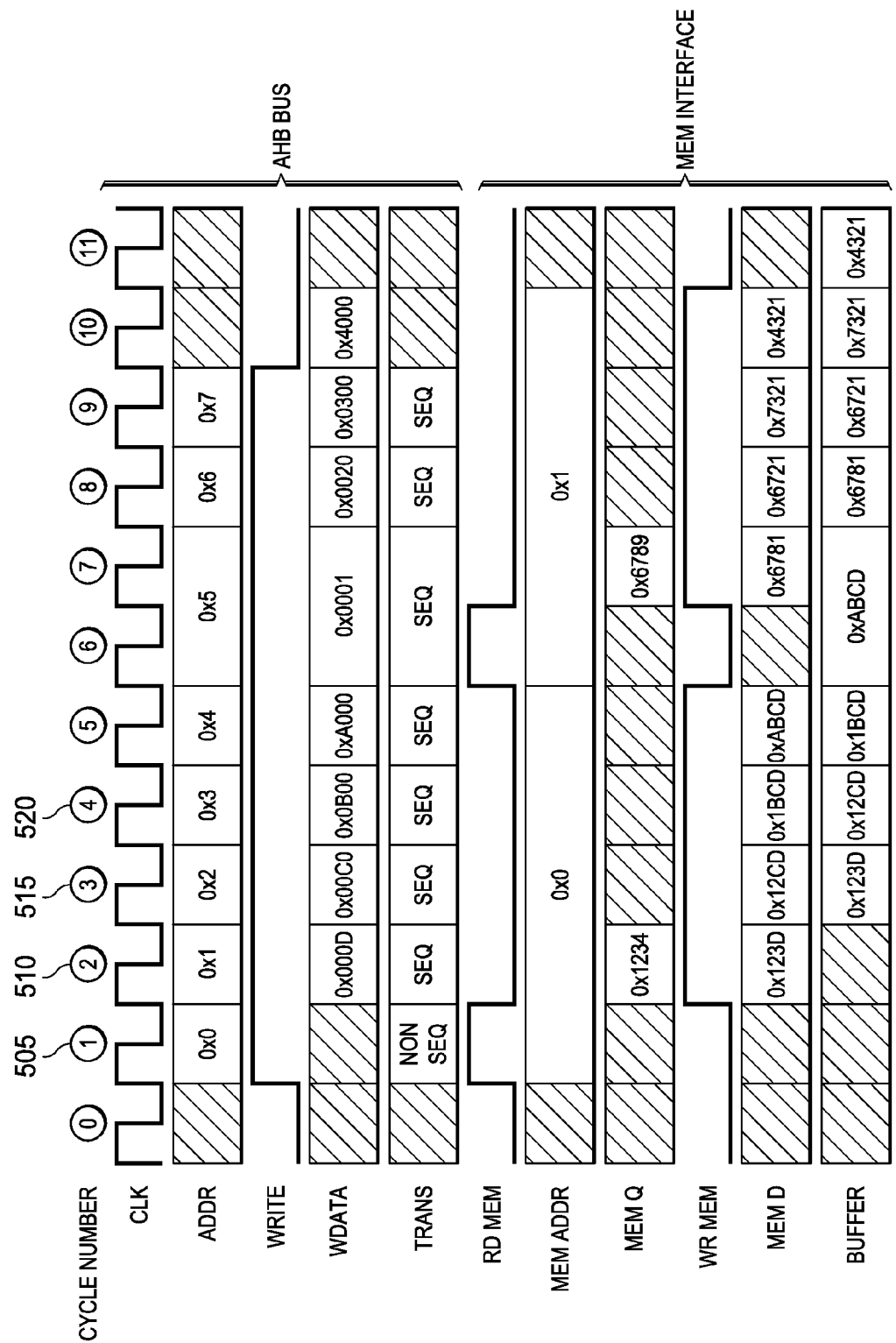
FIG. 5 is a timing diagram illustrating the byte access with burst of size 8 in accordance with an embodiment.

FIG. 5 illustrates a the byte accesses with burst of size 8, which improves the throughput by 88% without any memory area overhead using the proposed partial write implementation. Various cycles as illustrated is explained below.

Cycle 1 (505) is first access of burst access, address phase of write to address 0x0. On a byte write access (partial write operation), address of the access is compared with address of the data buffer, if address matches then data is taken from the data buffer, if not a read is initiated (RD MEM) in address phase of write access. First read always utilizes the address phase to read the data from memory so this will not have a performance impact. In this example it is assumed that required data is not available in the buffer. Due to this read access to address 0x0 is initiated.

Cycle 2 (510) is data phase of first access to address 0x0 and address phase of write to address to 0x1. In this cycle write is issued to 0x0 by manipulating the appropriate byte, same data will be stored in buffer. Data read from the memory is 0x1234. New data after modify operation is 0x123D. In this cycle with 0x123D is initiated to memory (WR MEM is high), same data is also loaded to BUFFER. Buffer holds the data for address 0x0, 0x1, 0x2, 0x3.

In cycle 3 (515) copy of memory data for address 0x1 is already available in the data buffer hence there is no need to initiate read access. So, write access can be issued immediately and gets completed with 0 cycle wait period. In similar manner write to 0x2 and 0x3 will get completed with 0 cycle wait period.

Cycle 4 (520) is byte writes access to 0x4. This access requires Read-Modify-write access because data for address 0x4 is not available in the data buffer. But the same point of time write to 0x3 is in progress so read to 0x4 cannot be issued hence introducing one wait state. Write to 0x4 will get completed with one wait state. Write to address 0x5, 0x6 and 0x7 will get completed with 0 wait period.

Overall 8 byte accesses are completed in 9 cycles which gives 88% throughput. If there are very long burst then throughput may be decreased to 80% that is 5 cycle for every 4 byte accesses. In this scheme performance of the half-word burst accesses is only improved by 50% because data word needs to read from the memory every 2 accesses.

Half word burst through can be improved in two ways. One is by increasing the memory data word to 64. In this case data words need to read for every 4 half-word accesses. This will improve the byte access performance further compared to 32 bit word.

Figure 6:
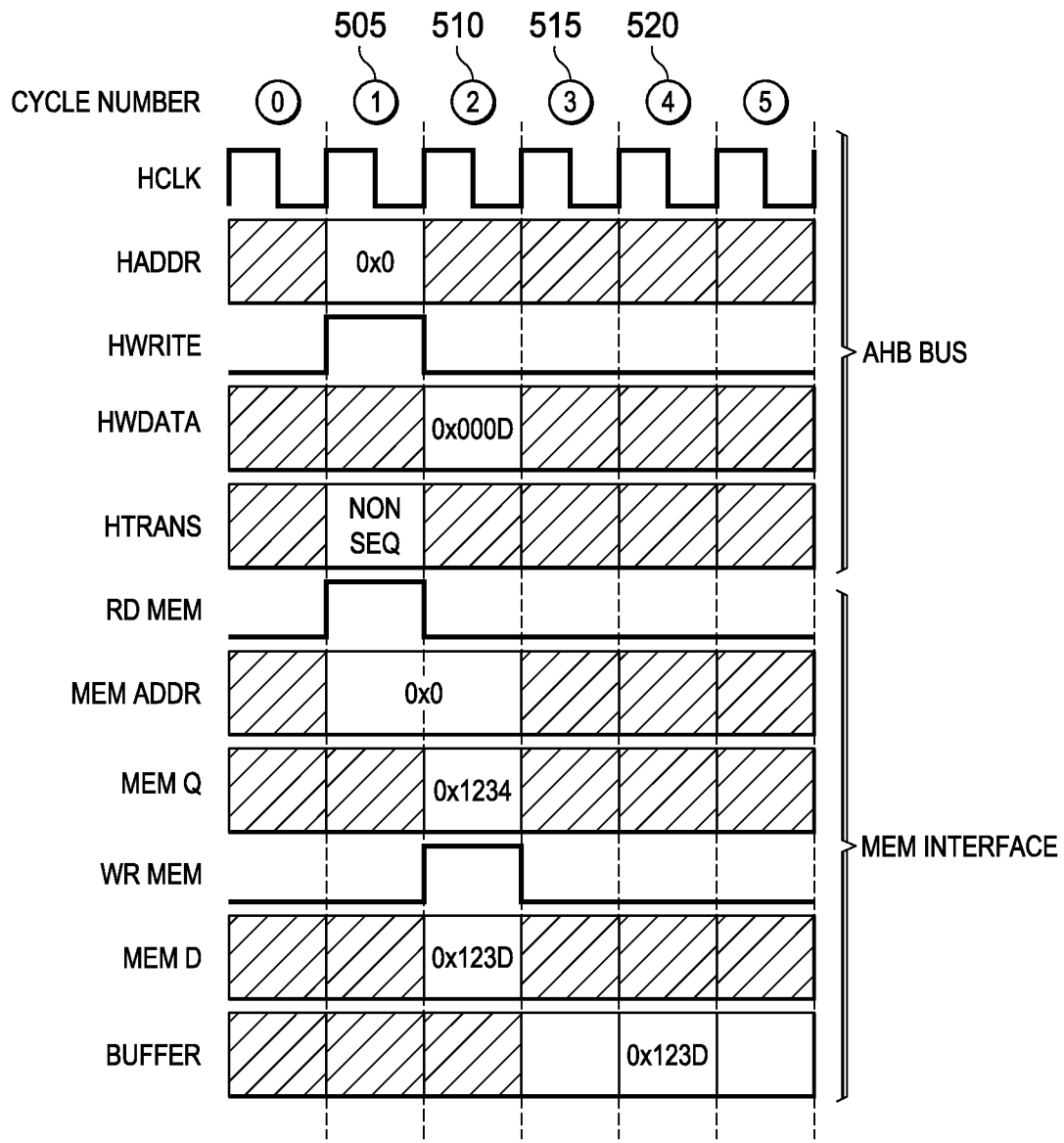
FIG. 6 is a timing diagram illustrating a discrete partial write in accordance with an embodiment.

FIG. 6 is a timing diagram illustrating a discrete partial write in accordance with an embodiment. Specifically, FIG. 6 illustrates how a discrete byte access is performed without a cycle penalty. An access preceded by a idle cycle (HTRANS=0) is called as discrete access. In such case address phase write access is utilized to for read the read operation that is cycle 1 (505). In the following cycle (510), when read data is available, a write operation is initiated with modified data.

The forgoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A memory system comprising:
a memory; and
a memory controller coupled to the memory, the memory controller comprising a data buffer configured to store a full data word as a result of a partial write operation, wherein for a subsequent partial write operation, data is read from the data buffer;
wherein the memory controller comprises:
a first multiplexer that selects data from one of the memory and the data buffer;
a second ECC check module coupled to the first multiplexer that performs an ECC check on an output of the first multiplexer;
a modify module coupled to the second ECC check module that performs a modify operation by taking required data from a request for the subsequent partial write operation and data from the full data word; and
a second multiplexer that selects data from the subsequent partial write request and output of the modify module.

2. The memory system of claim 1, wherein the memory is one of an error check code (ECC) enabled memory and a parity enabled memory.

3. The memory system of claim 1, wherein the subsequent partial write operation is into the full data word.

4. The memory system of claim 1, wherein the partial write operation and the subsequent partial write operation comprises a read, modify and write operation.

5. The memory system of claim 1, further comprising a first ECC check module, coupled to the data buffer, that performs an ECC check during the read operation.

6. The memory system of claim 1, wherein the request for the subsequent partial write operation is to the same full data word in the memory.

7. The memory system of claim 1, wherein a set of data fields of the data buffer comprises address, ECC for address, data and ECC for data and wherein the image is stored for an address specified in the address data field.

8. The memory system of claim 1 further comprising one of a central processing unit or a peripheral that sends request for the partial write operation and the subsequent partial write operation to the memory controller.

9. An integrated circuit comprising:
one of a central processing unit and a peripheral;
a memory system configured to communicate with one of the central processing unit and a peripheral, the memory system comprising:
a memory;
a memory controller coupled to the memory, the memory controller comprising a data buffer configured to store a full data word as a result of a partial write operation, wherein for a subsequent partial write operation, data is read from the data buffer, the memory controller further comprising:
a first multiplexer that selects data from one of the memory and the data buffer;

a first ECC check module, coupled to the data buffer, that performs an ECC check during the read operation;

a second ECC check module coupled to the first multiplexer that performs an ECC check on an output of the first multiplexer;

a modify module coupled to the second ECC check module that performs a modify operation by taking required data from a request for the subsequent partial write operation and data from the full data word; and a second multiplexer that selects data from and output of the modify module.

10. The memory system of claim 9, wherein the memory is one of an error check code (ECC) enabled memory and a parity enabled memory.

11. The memory system of claim 9, wherein the subsequent partial write operation is into the full data word.

12. The memory system of claim 9, wherein the partial write operation and the subsequent partial write operation comprises a read, modify and write operation.

13. The memory system of claim 9, wherein one of the central processing unit and the peripheral sends request for the partial write operation and the subsequent partial write operation to the memory controller.

* * * * *